(12) United States Patent
Tokui (10) Patent No.: US 10,567,670 B2
(45) Date of Patent: Feb. 18, 2020

(54) IMAGE-PROCESSING DEVICE

(71) Applicant: SHARP KABUSHIKI KAISHA, Sakai, Osaka (JP)

(72) Inventor: Nao Tokui, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 29 days.

(21) Appl. No.: 15/563,515

(22) PCT Filed: Mar. 9, 2016

(86) PCT No.: PCT/JP2016/057445
§ 371 (c)(1),
(2) Date: Sep. 29, 2017

(87) PCT Pub. No.: WO2016/158274
PCT Pub. Date: Oct. 6, 2016

(65) Prior Publication Data
US 2018/0097982 A1 Apr. 5, 2018

(30) Foreign Application Priority Data

Mar. 30, 2015 (JP) ................................ 2015-070256

(51) Int. Cl.
*G06K 9/00* (2006.01)
*H04N 5/238* (2006.01)
(Continued)

(52) U.S. Cl.
CPC ............ *H04N 5/238* (2013.01); *G03B 15/02* (2013.01); *G03B 17/18* (2013.01); *G03B 35/02* (2013.01);
(Continued)

(58) Field of Classification Search
None
See application file for complete search history.

(56) References Cited

U.S. PATENT DOCUMENTS 6,664,973 B1 * 12/2003 Iwamoto ................ G06T 5/009
345/589
7,120,294 B2 * 10/2006 Hirayama ................ G06T 5/20
382/162

(Continued)

FOREIGN PATENT DOCUMENTS

JP 2005-202807 A 7/2005
JP 2008-004085 A 1/2008
(Continued)

OTHER PUBLICATIONS

Office Action dated Jan. 23, 2018 against the counterpart Japanese patent application No. 2017-509480. English translation of the document is attached.
(Continued)

*Primary Examiner* — Hadi Akhavannik
(74) *Attorney, Agent, or Firm* — ScienBiziP, P.C.

(57) ABSTRACT

An image-processing device that is easily applicable even in a case where a subject is moving, and that generates an image having a suitable stereoscopic effect. An image-processing device (101) includes: a dark-part pixel extraction unit (107) that extracts one or more dark-part pixels; a dark-part pixel correction unit (108) that generates a correction image; a dark-part model generation unit (109) that generates a dark-part model on the basis of the dark-part pixels; and an image generation unit (110) that gives dark-part pixels constituting the dark-part model to the correction image.

4 Claims, 9 Drawing Sheets

(51) Int. Cl.
| | |
|---|---|
| *H04N 1/407* | (2006.01) |
| *H04N 1/60* | (2006.01) |
| *H04N 1/46* | (2006.01) |
| *H04N 13/207* | (2018.01) |
| *H04N 13/254* | (2018.01) |
| *G06K 9/56* | (2006.01) |
| *G06K 9/46* | (2006.01) |
| *H04N 1/409* | (2006.01) |
| *G03B 15/02* | (2006.01) |
| *G03B 17/18* | (2006.01) |
| *G03B 35/02* | (2006.01) |
| *H04N 1/387* | (2006.01) |

(52) U.S. Cl.
CPC ....... *G06K 9/00268* (2013.01); *G06K 9/4661* (2013.01); *G06K 9/56* (2013.01); *H04N 1/387* (2013.01); *H04N 1/407* (2013.01); *H04N 1/4092* (2013.01); *H04N 1/46* (2013.01); *H04N 1/60* (2013.01); *H04N 13/207* (2018.05); *H04N 13/254* (2018.05)

(56) References Cited

U.S. PATENT DOCUMENTS

| | | | | |
|---|---|---|---|---|
| 7,796,305 | B2* | 9/2010 | Ichihashi | G06T 5/50 358/452 |
| 8,009,903 | B2* | 8/2011 | Ojima | G06T 7/194 345/418 |
| 8,923,575 | B2* | 12/2014 | Tsukada | H04N 1/62 382/119 |
| 2005/0104974 | A1* | 5/2005 | Watanabe | H04N 1/6027 348/222.1 |
| 2005/0152613 | A1* | 7/2005 | Okutsu | G06T 5/00 382/254 |
| 2005/0280866 | A1* | 12/2005 | Ikeno | H04N 1/4072 358/2.1 |
| 2007/0262985 | A1* | 11/2007 | Watanabe | G06T 5/008 345/420 |
| 2007/0273686 | A1* | 11/2007 | Watanabe | G06T 15/506 345/419 |
| 2010/0226577 | A1 | 9/2010 | Saito et al. | |

FOREIGN PATENT DOCUMENTS

| | | |
|---|---|---|
| JP | 2010-211300 A | 9/2010 |
| JP | 2012-138819 A | 7/2012 |

OTHER PUBLICATIONS

BABA Masashi and three others, "Removal of shade from live-action image by color correction based on degree of shade", Visual Computing Graphics and CAD Joint Symposium 2003 Abstracts, The Institute of Image Electronics Engineers of Japan, Information Processing Society of Japan, Jun. 19, 2003, pp. 37-42 (Document of well-known art). (Please also see English translation of Office Action dated Jan. 23, 2018 against the counterpart Japanese patent application No. 2017-509480.).

* cited by examiner

| | | COLOR DIFFERENCE | | |
|---|---|---|---|---|
| | | SMALL | MIDDLE | LARGE |
| LUMINANCE DIFFERENCE | NEGATIVE | NOT DARK-PART REGION | | |
| | 0 | | | |
| | POSITIVE (SMALL) | DARK-PART REGION | | |
| | POSITIVE (MIDDLE) | | | |
| | POSITIVE (LARGE) | | | |

IMAGE-PROCESSING DEVICE

TECHNICAL FIELD

The present invention relates to an image-processing device that generates an image.

BACKGROUND ART

As a method of capturing an image of a subject attractively, there is a method in which lighting is applied to the subject by using illuminating equipment such as an external strobe or a reflector to thereby produce a stereoscopic effect. Since such a technique requires expensive equipment or a user's skill, it is difficult for a general user to capture an image for which desired lighting is applied.

PTL 1 discloses an image capturing device that is capable of obtaining an image in which desired lighting has been applied to a desired part.

CITATION LIST

Patent Literature

PTL 1: Japanese Unexamined Patent Application Publication No. 2012-138819 (published on Jul. 19, 2012)

SUMMARY OF INVENTION

Technical Problem

However, with the above-described method, it is necessary to capture an image of a subject a plurality of times while changing a position of illumination, so that application thereof to a moving object is difficult. For example, in a case where a subject is a human, the subject himself/herself moves his/her body unconsciously, e.g. blinks or closes his/her eyes when the illumination is dazzling. Thus, in a case of composing images captured over the plurality of times, positional deviation of the subject is caused between the captured images, so that it is difficult to obtain a naturally composed image.

The invention is made in view of the aforementioned problem, and an object thereof is to provide an image-processing device that, even in a case where a subject is moving, is easily applicable and capable of generating an image having a suitable stereoscopic effect.

Solution to Problem

According to an aspect of the invention, an image-processing device includes: a dark-part pixel extraction unit that extracts one or more dark-part pixels from a target image; a dark-part pixel correction unit that corrects the dark-part pixel so as to suppress change in contrast of the target image; a dark-part model generation unit that generates a dark-part model in accordance with the image corrected by the dark-part pixel correction unit; and an image generation unit that gives dark-part pixels constituting the dark-part model generated by the dark-part model generation unit to the image corrected by the dark-part pixel correction unit on the basis of the dark-part model.

Advantageous Effects of Invention

According to the invention, an image-processing device is easily applicable even in a case where a subject is moving, and capable of generating an image having a suitable stereoscopic effect.

DESCRIPTION OF EMBODIMENTS

Embodiment 1

Hereinafter, Embodiment 1 of the invention will be described with reference to appended drawings. Note that, the appended drawings illustrate a specific embodiment conforming to the principle of the invention, and are for understanding of the invention and never used to limitedly interpret the invention. In addition, configurations in the drawings are exaggerated for better understanding and different from actual intervals and sizes.

Figure 1:
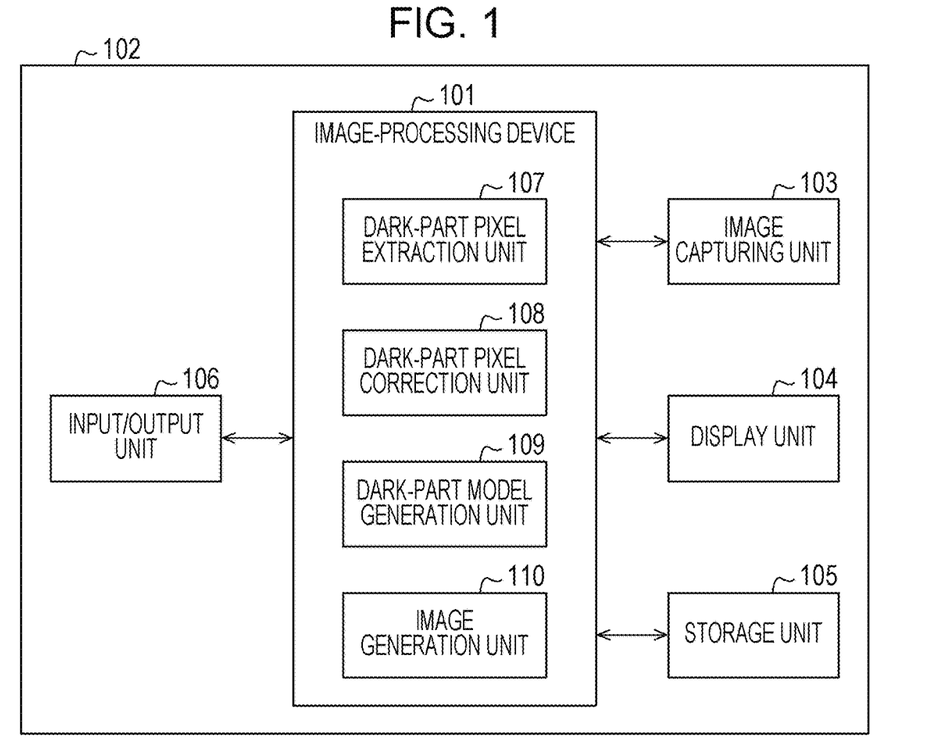
FIG. 1 is a functional block diagram illustrating a configuration of an image display apparatus that includes an image-processing device according to a first embodiment of the invention.

FIG. 1 is a functional block diagram illustrating a configuration of an image display apparatus 102 that includes an image-processing device 101 according to Embodiment 1 of the invention. In the present embodiment, description will be given for an example of a case where the image display apparatus 102 captures an image of a subject by an image capturing unit 103, generates an image having a suitable stereoscopic effect from the captured image, and displays the generated image on a display unit 104.

Hereinafter, a system configuration and an operation according to Embodiment 1 of the invention will be described in detail by using FIG. 1. The image display apparatus 102 includes the image capturing unit 103, the display unit 104, a storage unit 105, the image-processing device 101, and an input/output unit 106.

The image capturing unit 103 includes an image capturing lens and an image sensor such as a CCD (Charge Coupled Device) or a CMOS (Complementary Metal Oxide Semiconductor), and is able to capture a still image or a moving image of a subject.

The display unit 104 is a display screen such as an LCD (Liquid Crystal Display) or an organic EL (Electro Luminescence) display, and displays information such as an image or a letter, an image of a subject, or the like.

The image-processing device 101 is able to be constituted by a CPU (Central Processing Unit), a GPU (Graphic Processing Unit), or the like, for example. Moreover, the image-processing device 101 processes an image acquired from the image capturing unit 103, the storage unit 105, or the like on the basis of a user instruction acquired from the input/output unit 106, and outputs the processed image to at least one of the display unit 104 and the storage unit 105.

Moreover, the image-processing device 101 includes a dark-part pixel extraction unit 107, a dark-part pixel correction unit 108, a dark-part model generation unit 109, and an image generation unit 110. Each of the units performs each processing below.

<Dark-Part Pixel Extraction Processing>

The dark-part pixel extraction unit 107 extracts one or more dark-part pixels from an image acquired from the above-described image capturing unit 103, storage unit 105, or the like by the image-processing device 101. A dark-part pixel here means a pixel that constitutes shade which appears on a subject in an acquired image, and a place where there is a little change of luminance or color. For example, shade in a human face means a spot caused by unevenness of the face, a wrinkle such as a nasolabial sulcus, a shadow of a nose, a shadow appearing in a forehead, a cheek, or the like when light from a light source is shut, etc. Details of dark-part pixel extraction processing will be described below.

<Dark-Part Pixel Correction Processing>

The dark-part pixel correction unit 108 corrects at least one of the one or more dark-part pixels, which have been extracted by the dark-part pixel extraction unit 107, so as to suppress change in contrast of the image, and thereby generates a correction image. Details of dark-part pixel correction processing will be described below.

<Dark-Part Model Generation Processing>

The dark-part model generation unit 109 generates a dark-part model according to the subject on the basis of the dark-part pixels extracted by the dark-part pixel extraction unit 107. Details of dark-part model generation processing and the dark-part model will be described below.

<Image Generation Processing>

The image generation unit 110 generates, on the basis of the image (correction image) corrected by the dark-part pixel correction unit 108 and the dark-part model generated by the dark-part model generation unit, an image obtained by giving the dark-part pixels to the corrected image. Details of image generation processing will be described below.

The storage unit 105 is, for example, a flash memory or a hard disk, and stores dark-part pixel templates on the basis of which the image and the dark-part model are generated and the like and saves data specific to equipment.

The input/output unit 106 inputs a user instruction to the image-processing device 101 and outputs a sound or the like, which has been input, from the image-processing device 101 by using a key button, a microphone, a speaker, or the like. The above is the system configuration of Embodiment 1.

Figure 2:
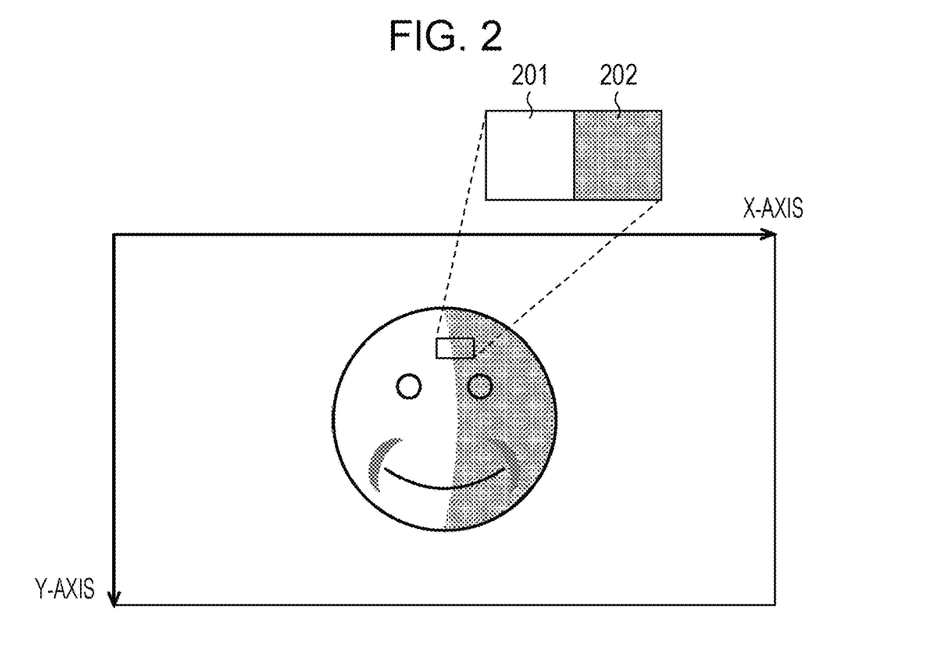
FIG. 2 is a view for explaining a relation between a target pixel and a neighboring pixel.
Figure 3:
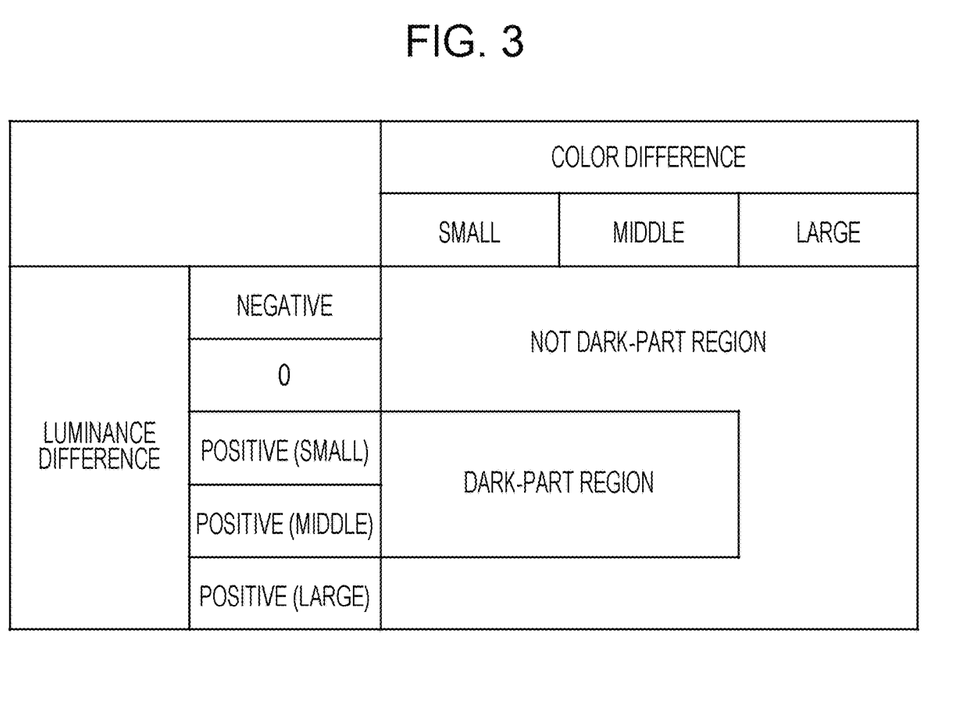
FIG. 3 is a view for explaining an indicator with which a target pixel is extracted as a dark-part pixel by using a color difference and a luminance difference.
Figure 4:
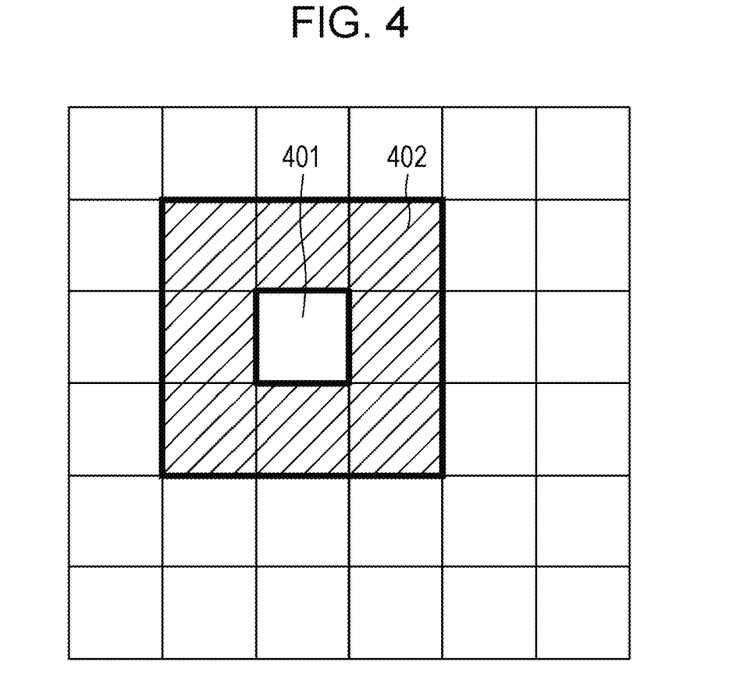
FIG. 4 is a view for explaining a relation between a target pixel and a plurality of neighboring pixels in a case where there are the plurality of neighboring pixels.

Next, the operation of the image display apparatus 102 in Embodiment 1 will be described in detail by using FIG. 2 to FIG. 8. First, the dark-part pixel extraction processing by the dark-part pixel extraction unit 107 will be described in detail by using FIG. 2 to FIG. 4. FIG. 2 is a view for explaining a relation between a target pixel 201 and a neighboring pixel 202 that is positioned in neighborhood of the target pixel 201, in a target image that is an image targeted for the processing. FIG. 3 is a view for explaining an indicator for a case where the target pixel is extracted as a dark-part pixel by using a color difference and a luminance difference. FIG. 4 is a view for explaining a relation between a target pixel and a plurality of neighboring pixels in a case where there are the plurality of neighboring pixels. The dark-part pixel extraction unit 107 determines whether or not the target pixel 201 is a dark-part pixel, on the basis of a color difference and a luminance difference between the target pixel 201 and the neighboring pixel 202. In a case where the target pixel 201 is determined to be a dark-part pixel, the dark-part pixel extraction unit 107 extracts the target pixel 201 as the dark-part pixel.

More specifically, the dark-part pixel extraction unit 107 calculates a color difference $S_h$ between the target pixel 201 and the neighboring pixel 202 by using a formula (1).

[Math 1]

$$S_h = \arctan(N_{r(i,j)} N_{r(i+1,j)} + N_{g(i,j)} N_{g(i+1,j)} + N_{b(i,j)} N_{b(i+1,j)}) \quad (1)$$

Here, $N_{(i,j)} = (N_{r(i,j)}, N_{g(i,j)}, N_{b(i,j)})$ is obtained by normalization performed with a pixel value $I_{(i,j)}$ of an (i, j)th pixel in a target pixel I regarded as vectors of three variables. The pixel value is represented with RGB values, that is, three values of R (Red), G (Green), and B (Blue), each of which is a value not less than 0 and not more than 1. When a horizontal direction of the image is an x-axis and a vertical direction is a y-axis and upper left coordinates of the image is an origin (0, 0), a variable i represents a position in the x-axis direction in the image, and is within a range from 0 to a value obtained by subtracting 1 from the number of pixels of the image in the horizontal direction. A variable j represents a position in the y-axis direction in the image, and is within a range from 0 to a value obtained by subtracting 1 from the number of pixels of the image in the vertical direction. When the target pixel 201 is the (i, j)th pixel, the neighboring pixel 202 is an (i+1, j)th pixel, so that a pixel value of the neighboring pixel 202 is $I_{(i+1,j)}$. It is set that a resultant of normalization performed with the pixel value $I_{(i+1,j)}$ regarded as vectors of three variables is $N_{(i+1,j)}$. The color difference $S_h$ takes a value which is not less than 0 and not more than 1, and, as being closer to 0, indicates that color shift is little. In a case where the target pixel 201 and the neighboring pixel 202 have the same RGB values as pixel values, the color difference $S_h$ is 0 which is minimum. For example, in a case where the target pixel 201 is achromatic and the neighboring pixel 202 is red, the color difference $S_h$ takes 0.9 which is a value close to a maximum value. As above, the color difference between the target pixel 201 and the neighboring pixel 202 is represented by using an angle formed by the vectors when the RGB values of the target pixel 201 and the neighboring pixel 202 are regarded as the vectors.

Moreover, the dark-part pixel extraction unit 107 calculates a luminance difference $S_y$ between the target pixel 201 and the neighboring pixel 202 with a formula (2).

[Math 2]

$$S_y = y_{(i+1,j)} - y_{(i,j)} \quad (2)$$

Here, it is set that luminance of the target pixel 201 is $y_{(i,j)}$ and luminance of the neighboring pixel 202 is $y_{(i+1,j)}$. Normalization is performed so that the luminance difference takes a value not less than −1 and not more than 1. In a case where the target pixel 201 and the neighboring pixel 202 have the same luminance value, the luminance difference is 0, and, in a case where the target pixel 201 is 0, that is, black and the neighboring pixel 202 is 1, that is, white, the luminance difference is 1 which is maximum. The dark-part pixel extraction unit 107 executes conversion processing from the RGB values into luminance y by using a formula (3).

[Math 3]

$$y=0.299I_r+0.587I_g+0.114I_b \quad (3)$$

The dark-part pixel extraction unit 107 may be configured to use an average value $(I_r+I_g+I_b)/3$ of the RGB values, the $I_g$ value, or the like as the luminance of the pixel.

The dark-part pixel extraction unit 107 performs extraction processing of a dark-part pixel on the basis of at least one of the color difference and the luminance difference between the target pixel 201 and the neighboring pixel 202, each of which is calculated by each of the above-described methods. FIG. 3 illustrates the indicator for a case where the target pixel 201 is extracted as a dark-part pixel by using the color difference and the luminance difference. In a case where the luminance difference is 0 or a negative value, the dark-part pixel extraction unit 107 determines that the target pixel 201 is not in a dark-part region. This is because the luminance of the neighboring pixel 202 is lower than the luminance of the target pixel 201, and therefore there is a high possibility that the neighboring pixel 202 is in a dark-part region. Also in a case where the luminance difference is a positive value and the color difference or the luminance difference is equal to or more than each predetermined threshold, the dark-part pixel extraction unit 107 determines that the target pixel 201 is not in a dark-part region. This is because there is a high possibility that a place where both a color and luminance fluctuate greatly is a contour of a subject. In a case where the luminance difference is a positive value and each of the color difference and the luminance difference is smaller than each of the predetermined thresholds, the dark-part pixel extraction unit 107 extracts the target pixel 201 as a first dark-part pixel. Each of the thresholds related to the color difference and the luminance difference is able to be set in the dark-part pixel extraction unit 107 by using a method of performing calculation by analyzing, in advance, a place where a dark-part pixel and a non-dark-part pixel of a subject are adjacent to each other, a method of performing calculation from a user setting value which is input from the input/output unit, or the like. For example, in a case where the user setting value is "emphasized shade", the dark-part pixel extraction unit 107 sets each of the thresholds to be large, and, in a case where the user setting value is "little shade", the dark-part pixel extraction unit 107 sets each of the thresholds to be small to thereby set optimum thresholds.

Note that, the methods of setting the thresholds are not limited to the aforementioned examples, and a publicly known method may be applied therefor.

Since, in the above-described method, the target pixel is arranged on a right side of the image and the neighboring pixel is arranged on a left side of the image, the dark-part pixel extraction unit 107 extracts, as dark-part pixels, only shade which gradually becomes darker as being closer to the right side from the left side in the image, but, in an actual image, it is necessary to extract a place, which gradually becomes darker, in any of vertical, horizontal, and oblique directions as dark-part pixels. In order to extract shade in all directions as dark-part pixels, eight pixels positioned in the vertical, horizontal, and oblique directions of a target pixel 401 are set as neighboring pixels 402 of the target pixel 401 as illustrated in FIG. 4. In a case where the neighboring pixels 402 are eight pixels, calculation by which whether or not the target pixel 401 is extracted as a dark-part pixel is determined is performed for each of the target pixel 401 and the eight pixels which are the neighboring pixels 402.

More specifically, first, the dark-part pixel extraction unit 107 sets a pair, in which one element is the target pixel 401 and the other element is one of the plurality of neighboring pixels 402, with respect to each of the plurality of neighboring pixels 402. For example, in a case where the neighboring pixels 402 are eight pixels, when the neighboring pixels are represented as NP1 to NP8 and the target pixel is represented as IP, the dark-part pixel extraction unit 107 sets eight pairs in total, that is, (NP1, IP), (NP2, IP), ..., and (NP8, IP). Subsequently, in a case where, among the pairs of the target pixel 401 and the neighboring pixel 402, the number of pairs in which the target pixel 401 is determined to be a dark-part pixel is larger than the number of pairs in which the target pixel 401 is determined not to be a dark-part pixel, the dark-part pixel extraction unit 107 extracts the target pixel 401 as a dark-part pixel.

Moreover, the dark-part pixel extraction unit 107 may determine whether or not the target pixel 401 is a dark-part pixel by using a result of weighting each of determination results obtained by determining, as to each of the neighboring pixels, whether or not the neighboring pixel is a dark-part pixel. When the above-described determination method is performed, for example, by weighting with the use of a precondition such that there are any cases where shade becomes darker as being close to a bottom from a top, it is possible to have priority to determination of neighboring pixels 402 which are positioned in the vertical direction of the target pixel 401. Thereby, it is possible to suppress erroneous extraction of a dark-part pixel in a large number of images, so that it is suitable.

Note that, in the above, the dark-part pixel extraction unit 107 weights the results obtained by determining, for each of the neighboring pixels, whether or not the neighboring pixel is the first dark-part pixel to determine whether or not the target pixel 401 is a dark-part pixel, but the dark-part pixel extraction unit 107 may total up all of results obtained by weighting color differences and luminance differences each of which is calculated for each of the neighboring pixels, and determine whether or not the target pixel 401 is a dark-part pixel by using the total value and the above-described thresholds. Specifically, in a case where the target pixel IP and the neighboring pixels of the eight pixels (NP1 to NP8) are provided, the dark-part pixel extraction unit 107 may be configured to calculate a total value $S_{y\_sum}$ of the luminance differences and a total value $S_{h\_sum}$ of the color differences by formulas (4) and (5) when the luminance difference between the target pixel IP and the neighboring pixel NP1 is $S_{y1}$ and the color difference therebetween is $S_{h1}$, the luminance difference between the target pixel IP and the neighboring pixel NP2 is $S_{y2}$ and the color difference therebetween is $S_{h2}$, ..., and the luminance difference between the target pixel IP and the neighboring pixel NP8 is $S_{y8}$ and the color difference therebetween is $S_{h8}$.

[Math 4]

$$s_{y\_sum} = \sum_{i \in k} \alpha_i s_{yi} \quad (4)$$

[Math 5]

$$s_{h\_sum} = \sum_{i \in k} \beta_i s_{hi} \quad (5)$$

Here, k denotes a range of the neighboring pixel, α denotes a weighting coefficient for the luminance values, and β denotes a weighting coefficient for the color differences. It is set that α and β are positive values. When both of the weighting coefficients α and β are set to be 1, sum totals of the luminance differences and the color differences are calculated as the totaled results $S_{y\_sum}$ and $S_{h\_sum}$, respectively. By setting a and R to be different values, it is possible to control dark-part pixel extraction. For example, when the weighting coefficient α is set to be a value close to 1 and β is set to be a value close to 0 such as 0.01, it is possible to perform dark-part pixel determination with the luminance differences focused on more than the color differences. Since even a subject having complicated texture is able to be considered to be composed of almost a single color when being viewed in a local region, it is effective in a case where each local region set for a subject is small enough.

As above, the dark-part pixel extraction processing is performed by the dark-part pixel extraction unit 107.

Figure 5:
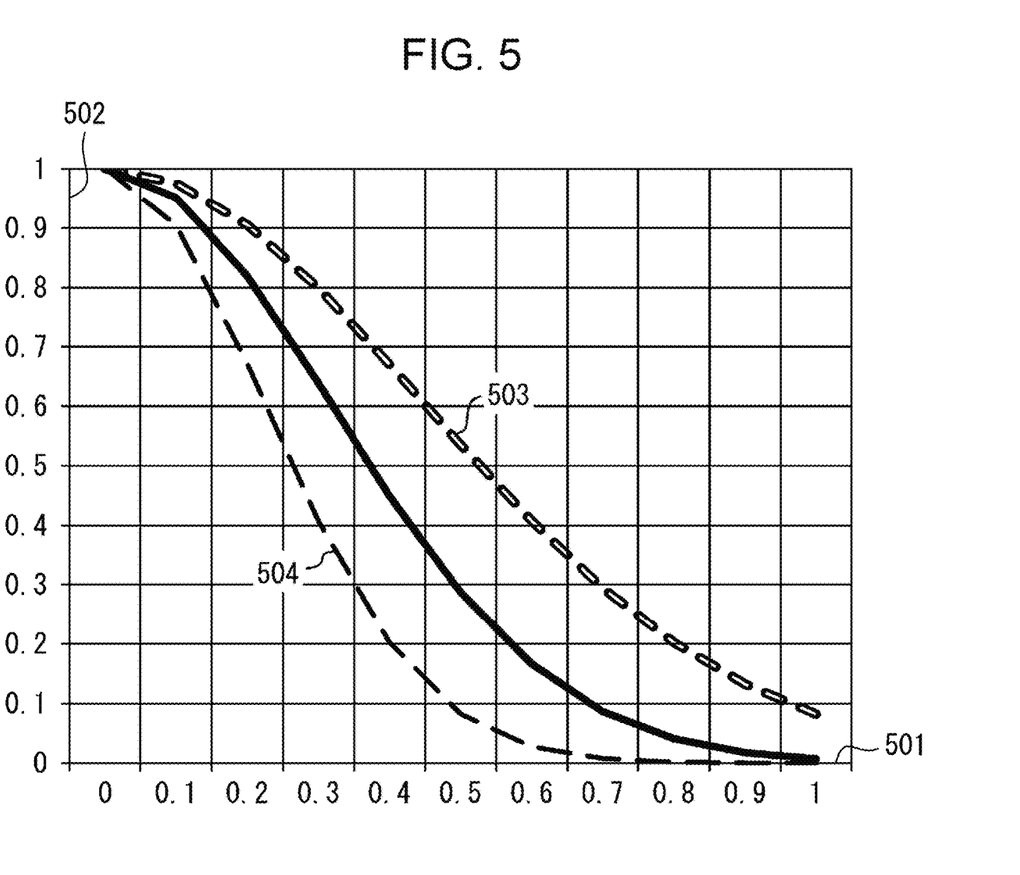
FIG. 5 is a view for explaining a relation between dispersion of a luminance difference and a weight in dark-part pixel correction.

Next, the details of the dark-part pixel correction processing by the dark-part pixel correction unit 108 will be described by using FIG. 5. FIG. 5 is a view for explaining a relation between dispersion of a luminance difference and a weight. The dark-part pixel correction unit 108 performs correction so as to reduce a difference of pixel values between a dark-part pixel and a pixel which is not the dark-part pixel in order to suppress change in contrast of an image.

The dark-part pixel correction unit 108 applies the dark-part pixel correction processing to a dark-part pixel extracted by the dark-part pixel extraction unit 107. Specifically, in a case where the target pixel $I_{(i,j)}$ is a dark-part pixel, when an image subjected to dark-part pixel correction (correction image) is set to be I' and neighborhood of N× M is used as neighboring pixels of the first dark-part pixel, the image I' subjected to the correction is calculated by using formulas (6) and (7).

[Math 6]

$$I'_{(i,j)} = \frac{1}{NM \sum_{k=-\frac{N}{2}}^{\frac{N}{2}} \sum_{l=-\frac{M}{2}}^{\frac{M}{2}} \omega_{kl}} \sum_{k=-\frac{N}{2}}^{\frac{N}{2}} \sum_{l=-\frac{M}{2}}^{\frac{M}{2}} \omega_{kl} I_{(i+k,j+l)} \quad (6)$$

[Math 7]

$$\omega_{kl} = \exp\left(-\frac{(y_{(i+k,j+l)} - y_{(i,j)})^2}{\sigma}\right) \quad (7)$$

Here, the pixel value $I_{(i,j)}$ indicates a pixel value of the (i, j)th pixel in the target image I. In a case where the target pixel $I_{(i,j)}$ is not a dark-part pixel, $I'_{(i,j)} = I_{(i,j)}$ is satisfied.

By applying weighted smoothing processing to each neighboring pixel with respect to the target pixel in this manner, the dark-part pixel correction unit reduces a difference of pixel values between a dark-part pixel and a pixel which is not the dark-part pixel to thereby suppress change in contrast. As shown by the formula (7), a weight $\omega_{k1}$ is a weighting coefficient of a Gaussian (normal distribution) type. A value of the weight $\omega_{k1}$ becomes larger when a luminance difference between a dark-part pixel and a neighboring pixel is small. That is, there is a high possibility that, between a dark-part pixel and a neighboring pixel, one that has a small luminance difference therebetween represent shade, so that the dark-part pixel correction unit 108 increases a weight. In contrast, there is a high possibility that, between a dark-part pixel and a neighboring pixel, one that has a large luminance difference therebetween represent a contour of a subject, so that the dark-part pixel correction unit 108 reduces a weight. Here, σ in the formula (7) represents dispersion of a luminance difference between a dark-part pixel and a neighboring pixel. The dark-part pixel correction unit 108 is able to control to what extent to allow a difference between luminance of a target pixel and luminance of a neighboring pixel by changing a value of dispersion σ. The dark-part pixel correction unit 108 is able to control a degree of propagation of a pixel value of a pixel which is not a dark-part pixel to the dark-part pixel by changing the value of dispersion σ. Thereby, the dark-part pixel correction unit 108 is able to control a degree of smoothing and adjust a degree of suppression of change in contrast. In FIG. 5, a horizontal axis 501 indicates a luminance difference and a vertical axis 502 indicates a weight ω. When the dispersion σ becomes large, the degree of propagation becomes high as indicated by a curved line 503, but it is difficult to distinguish between a contour part and a non-contour part of a subject, so that the contour of the subject becomes blurred. When a small value is set for the dispersion σ, the degree of propagation becomes low as indicated by a curved line 504 and blur of the contour of the subject is prevented, but the degree of suppression of change in contrast becomes low. Then, it is preferable that the dark-part pixel correction unit 108 sets a small value for the dispersion σ and executes a method of repeatedly applying the dark-part pixel correction processing. By adopting such a method, it is possible to propagate a pixel value of a pixel which is not a dark-part pixel to the dark-part pixel every time the dark-part pixel correction processing is repeated, and it is possible to suppress change in contrast while keeping a contour of a subject, so that it is suitable.

As a specific method of setting the dispersion σ, it is suitable that the dispersion σ is set to be about twice a dispersion value of shade targeted for extraction. For example, when a pixel value is set from 0 to 255 gradations and a dispersion value of shade is 10, the dispersion σ may be set to be 20. In this case, since RGB values representing a pixel value are normalized so as to be equal to or more than 0 and less than 1 to be used, σ=0.08 (=20/255) is set. In a case where a dispersion value of shade is not known, the dispersion σ may be set to be small, for example, σ=0.04 (=10/255).

As above, the dark-part pixel correction processing by the dark-part pixel correction unit 108 is performed.

Figure 6:
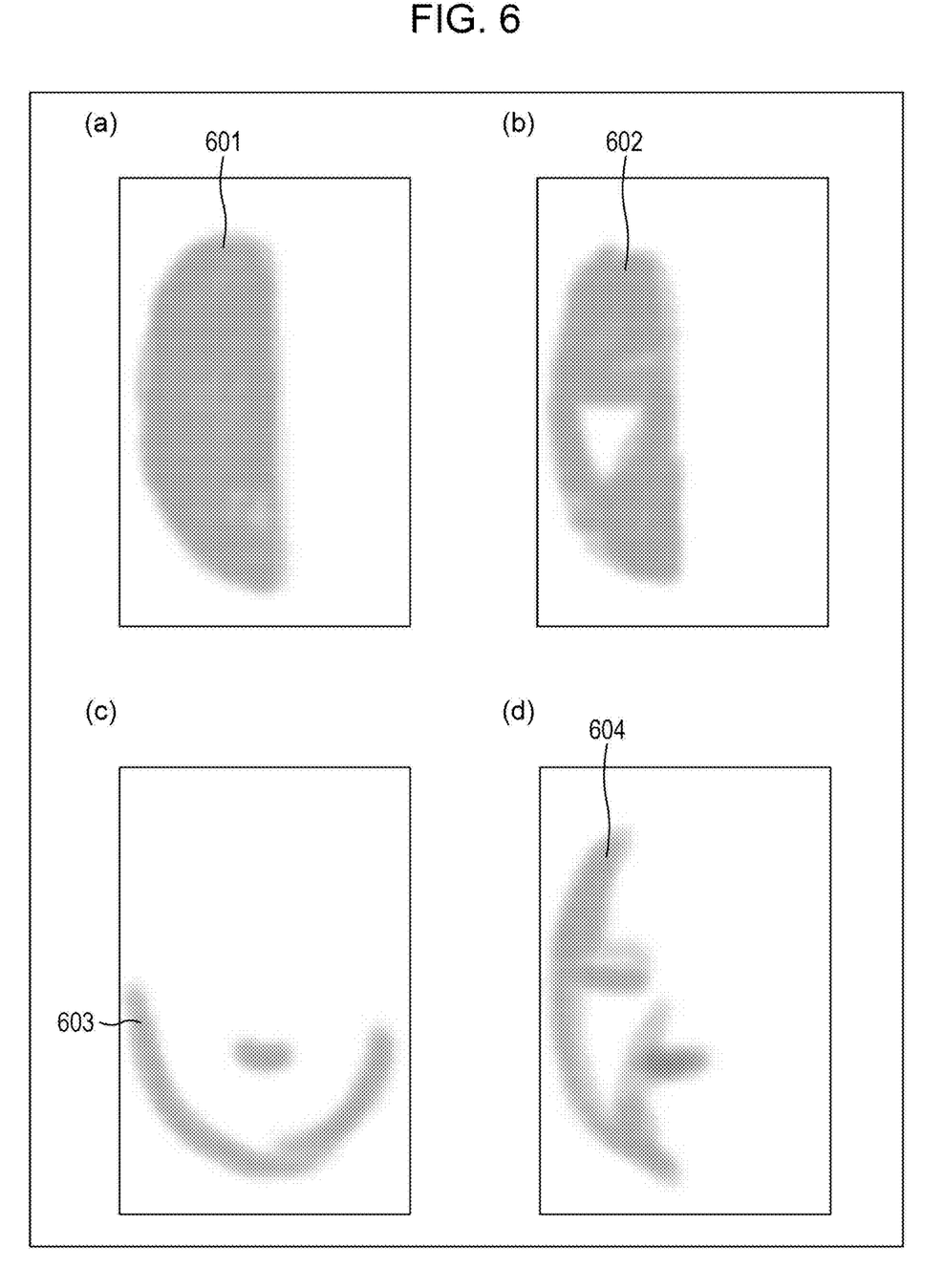
FIG. 6 is a view for explaining dark-part pixel templates of shades that appear when lighting is applied to a human face.

Next, the dark-part model generation processing by the dark-part model generation unit 109 will be described by using FIG. 6. FIG. 6 is a view for explaining examples of cases where shades that appear when lighting is applied to a human face are used as dark-part pixel templates. The dark-part model generation unit 109 generates a dark-part model on the basis of dark-part pixels extracted by the dark-part pixel extraction unit 107. The dark-part model means a model constituted by dark-part pixels to be given to a subject. For example, in a case where a subject is a human face, by correcting the dark-part pixels extracted by the dark-part pixel extraction unit 107 so as to be horizontally symmetrical and using the corrected dark-part pixels as a dark-part model, the dark-part model generation unit 109 is able to generate an image in which symmetry of the face is improved. Since it is possible to generate a dark-part model suitable for a subject by using the dark-part pixels extracted from the subject, it is possible to improve quality of an image generated by the image generation unit, so that it is suitable.

As above, the dark-part model generation unit 109 is able to generate a dark-part model by appropriately duplicating and rearranging a dark-part pixel extracted by the dark-part pixel extraction unit 107.

Moreover, when the dark-part model generation unit is configured to generate a dark-part model on the basis of a dark-part pixel template held in the storage unit 105, it is possible to easily generate dark-part models to which various types of lighting are applied, so that it is suitable. The dark-part pixel template here means one that is obtained by extracting, as dark-part pixels, shade appearing when lighting is applied to a subject, such as a split light template 601, a Rembrandt light template 602, a butterfly light template 603, or a loop light template 604. The dark-part model generation unit 109 generates a dark-part model S on the basis of these dark-part pixel templates T by using a formula (8).

[Math 8]

$$S=f(T,I',U) \qquad (8)$$

Here, a function f is a function by which the dark-part pixel templates T are corrected so as to match the image I' subjected to the dark-part pixel correction. In the correction, the dark-part model generation unit 109 is able to change a giving position of the dark-part model S, which is on the image I', and a size thereof. First, the dark-part model S is arranged on an image center of the image I', and the size thereof is set to be a half of that of the image. The giving position and the size of the dark-part model are changed in accordance with an instruction U of a user, which is input from the input/output unit 106, and the giving position of the dark-part model S, which is on the image I', and the size thereof are adjusted. For example, in a case where a generated dark-part model is generated so as to be larger than a subject, the user gives an instruction for performing dark-part model reduction processing to thereby reduce the dark-part model. In a case where a position of a generated dark-part model is deviated from a position of a subject, the user gives an instruction for performing movement processing of the dark-part model to thereby change the position of the dark-part model. At this time, if a configuration in which, when the subject is a known object such as a human face, the dark-part model generation unit 109 automatically changes the giving position and the size of the dark-part model in accordance with distribution of a skin color in the image is provided, the dark-part model is given to an appropriate position without adjustment performed by the user, so that it is suitable.

As above, the dark-part model generation processing by the dark-part model generation unit 109 is performed.

Figure 7:
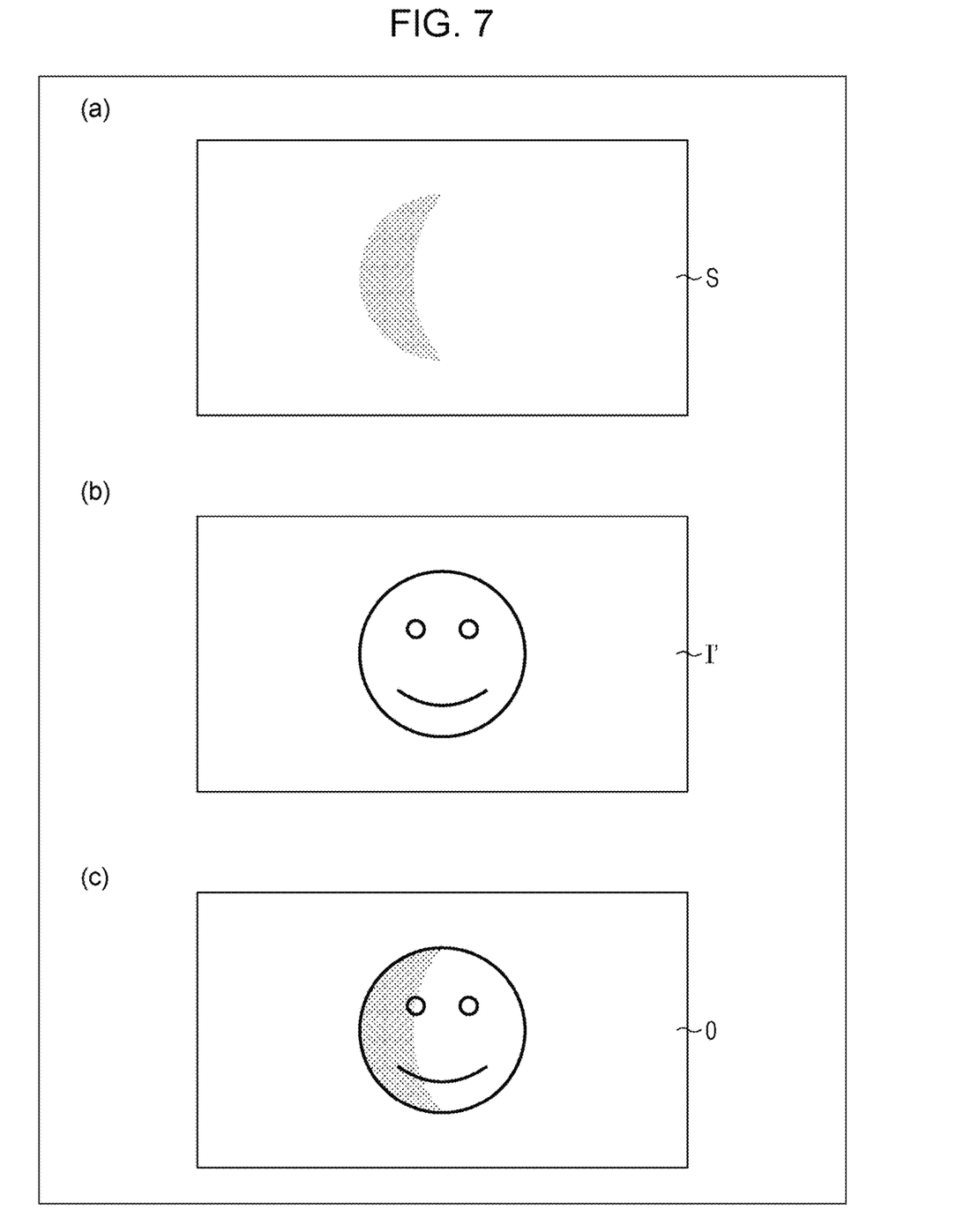
FIG. 7 is a view for explaining dark-part pixel giving based on a dark-part model.

Lastly, the image generation processing by the image generation unit 110 will be described in detail by using FIG. 7. FIG. 7 is a view for explaining dark-part pixel giving based on a dark-part model.

From the dark-part model S and the image (correction image) I' in which a dark-part pixel is corrected, the image generation unit 110 generates an image O, to which the dark-part pixel is given, by using a formula (9). There are some cases in which the image O is referred to as an image to which the dark-part model S is applied or an image to which the dark-part model S is given.

[Math 9]

$$O=SI' \qquad (9)$$

The dark-part model S has a value not less than 0 and not more than 1 for each pixel. When a value S(i, j) of the dark-part model S in the (i, j)th pixel is 1, a pixel value O(i, j) of the generated image O and the pixel value I'(i, j) of the image I' in which the dark-part pixel is corrected are the same value. When the value S(i, j) of the dark-part model S in the (i, j)th pixel is 0, the pixel value O(i, j) of the generated image O is 0. That is, as the value of the dark-part model S is closer to 0, the pixel value of the generated image O becomes darker, and the value of the dark-part model S is closer to 1, the pixel value of the generated image O becomes closer to that of the image I' in which the dark-part pixel is corrected.

Moreover, the image generation unit 110 may correct brightness of the generated image by taking appearance of a color to a human into consideration. Among ways of appearance of a color to a human, as one that is related to brightness, there is a color area effect. The color area effect is a phenomenon that appearance of a color changes in accordance with a size of a presented area even when the color is physically the same. When the presented area becomes larger, a dark-part pixel appears to be darker, so that it is preferable that the image generation unit 110 changes brightness of a dark-part model so as to counteract the color area effect. Specifically, it is preferable that the image generation unit 110 changes brightness of a dark-part model (brightness of a dark-part pixel constituting a dark-part model) in accordance with a sum of pixels (in other words, a sum of pixels overlapping with the dark-part model) in an image, to which the dark-part model is given, and performs image generation by using the changed dark-part model.

In the aforementioned processing, as the sum of the pixels becomes larger, the brightness of the dark-part model is increased, and, as the sum becomes smaller, the brightness of the dark-part model is reduced. Thereby, it is possible to give a natural dark-part model in which appearance of a color to a human is taken into consideration, so that it is suitable.

Note that, a configuration in which the image generation unit 110 applies a dark-part model and, furthermore, changes brightness after the application of the dark-part model in accordance with a sum of pixels (in other words, a sum of pixels overlapping with the dark-part model) to which the dark-part model is given may be provided.

Furthermore, the image generation unit 110 may correct a hue of the generated image in accordance with the appearance of a color to a human. Among the ways of appearance of a color to a human, as one that is related to a hue, there is Bezold-Brucke phenomenon. Bezold-Brucke phenomenon is a phenomenon that a hue changes in accordance with brightness, and, specifically, a phenomenon that reddish purple and orange changes to red and yellow-green and blue-green changes to green when brightness is reduced. The image generation unit 110 changes a hue of a dark-part model in accordance with brightness of the dark-part model and a hue of a pixel in an image, to which the dark-part model is given. As the brightness of the dark-part model is reduced, the image generation unit 110 determines that an effect of shade is great, and increases the change of the hue of the dark-part model. Moreover, as the brightness of the dark-part model is increased, the image generation unit 110 determines that the effect of shade is small, and reduces the change of the hue of the dark-part model. In addition, when the hue of the pixel in the image, to which the dark-part model is given, is included in a range from reddish purple to orange, the image generation unit 110 changes the hue of the dark-part model so that red becomes strong. When the hue of the pixel in the image, to which the dark-part model is given, is included in a range from yellow-green to blue-green, the image generation unit 110 changes the hue of the dark-part model so that green becomes strong. When a subject for which the dark-part model is given is a human face, since there is a high possibility that a hue of a skin color is included in the range from reddish purple to orange, when the image generation unit 110 changes a hue of the dark-part model so that red becomes strong, it is possible to give a natural dark-part model with less sense of incongruity, so that it is suitable.

By the above-described processing, since it is possible to give a dark-part model that takes appearance of a color to a human into consideration, it is possible to improve quality of a generated image, so that it is suitable.

Note that, a configuration in which the image generation unit 110 changes a hue of an image, to which the dark-part model has been applied, in accordance with the brightness of the dark-part model and the hue of the pixel in the image, to which the dark-part model is given, may be provided.

As above, the image generation processing by the image generation unit 110 is performed.

Figure 8:
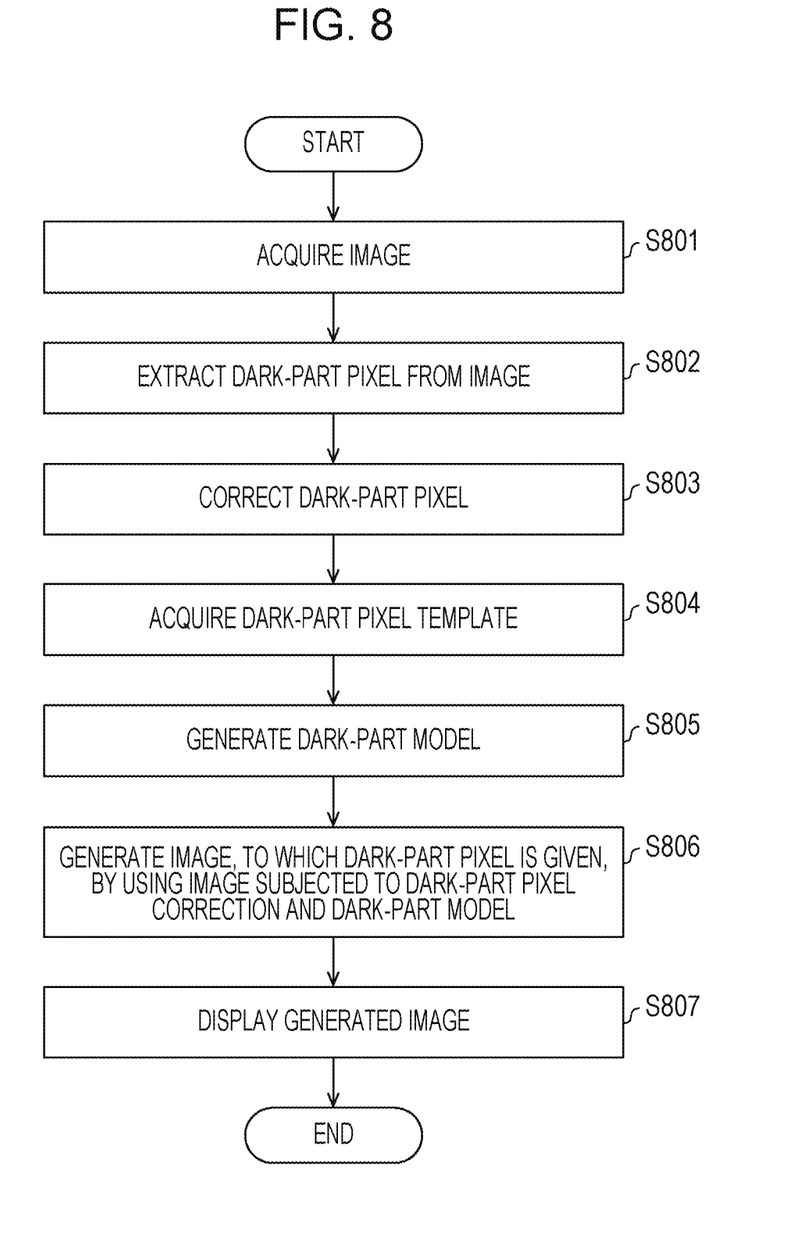
FIG. 8 is a flowchart illustrating a flow of image processing in the first embodiment of the invention.

In the above, a flow of the aforementioned operation will be described by using a flowchart illustrated in FIG. 8.

First, at step S801, the image-processing device 101 takes in an image from the image capturing unit 103 or the storage unit 105. Next, at step S802, the dark-part pixel extraction unit 107 extracts a dark-part pixel from the image taken in at step S801 (which corresponds to the above-described dark-part pixel extraction processing). Then, at step S803, the dark-part pixel correction unit 108 corrects the dark-part pixel extracted at step S802 (which corresponds to the above-described dark-part pixel correction processing). Next, at step S804, a dark-part pixel template is acquired from the storage unit 105. Thereafter, at step S805, the dark-part model generation unit 109 generates a dark-part model by using the dark-part pixel template acquired at step S804 (which corresponds to the above-described dark-part model generation processing). Next, at step S806, the image generation unit 110 gives the dark-part model to the image, subjected to the dark-part pixel correction, by using the dark-part model generated at step S805 and generates an image like an image captured by changing a position of illumination (which corresponds to the above-described image generation processing). Then, at step S807, the image generation unit 110 outputs the image generated at step S806 to the display unit 104. The above is the flow of the operation of the image-processing device 101. The image display apparatus 102 in the first exemplary embodiment operates in the above-described manner.

With the image display apparatus 102 that includes the above-described image-processing device 101 according to the invention, by giving desired shade after correcting a dark-part pixel which is not desired by a user, it is possible to display an image having a suitable stereoscopic effect. In addition, since processing in which an image of a subject is captured a plurality of times while changing a position of illumination as a conventional technique is not necessary, the invention is easily applicable even to a moving object.

Embodiment 2

Figure 9:
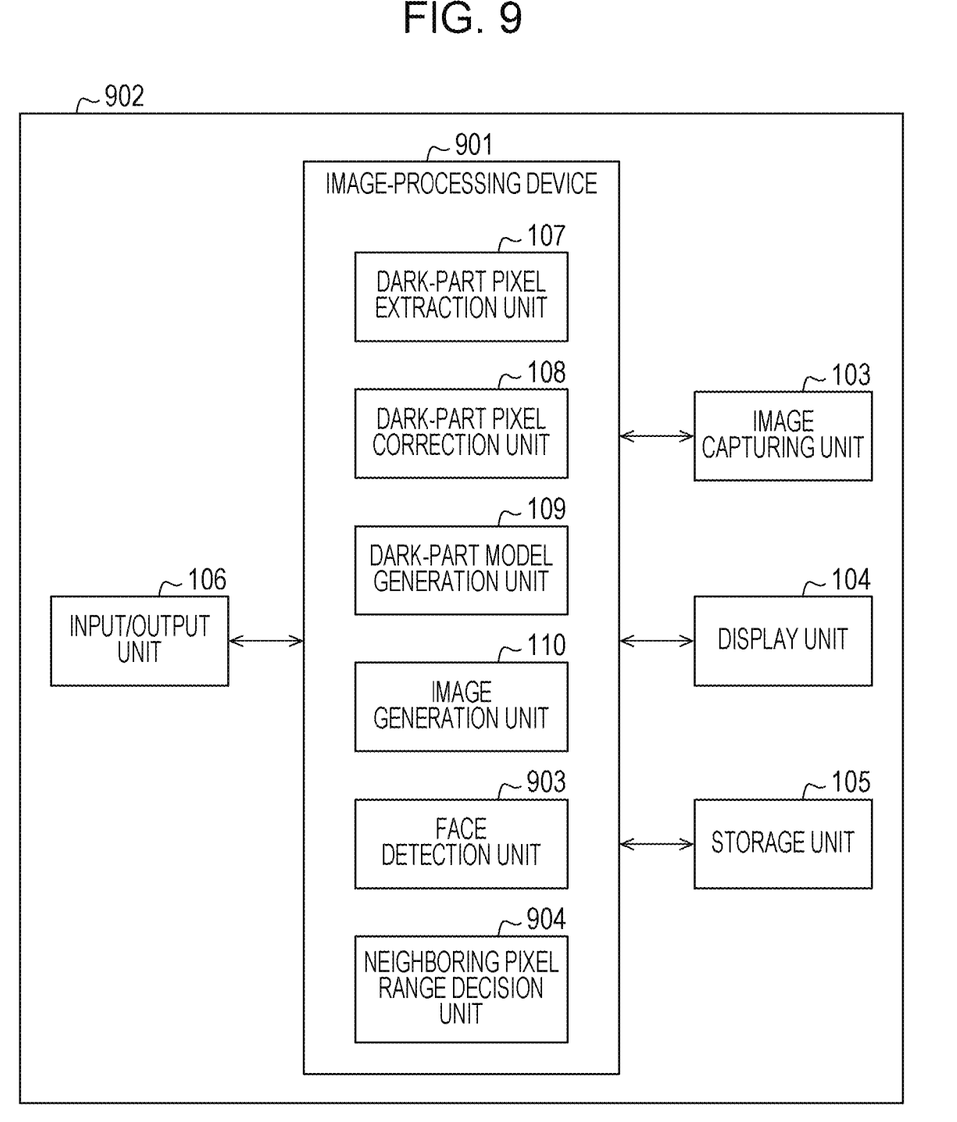
FIG. 9 is a functional block diagram illustrating a configuration example of an image display apparatus that includes image processing according to a second embodiment of the invention.

Next, a configuration of an image display apparatus 902 that includes an image-processing device 901 according to a second exemplary embodiment of the invention will be described by using FIG. 9. In FIG. 9, the same numbers are assigned to the same constituents as those of FIG. 1, and description thereof is omitted since each of the constituents performs the same processing as that of the exemplary embodiment of FIG. 9.

The present exemplary embodiment is different from the first exemplary embodiment in that the image display apparatus 102 is configured to include a face detection unit 903 that detects information of a size of a face and a neighboring pixel range decision unit 904 that decides a possible range of a neighboring pixel, which is set by the dark-part pixel extraction unit 107, on the basis of the information of the size of the face, which is detected by the face detection unit 903.

Figure 10:
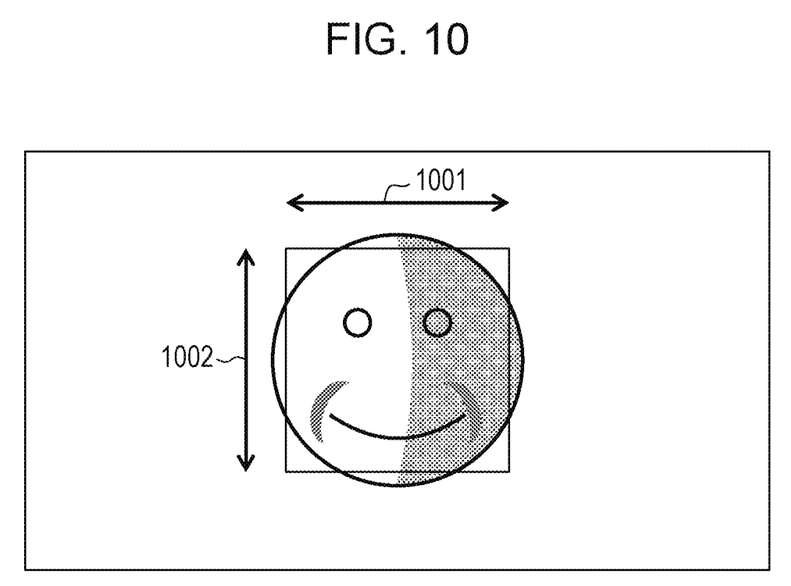
FIG. 10 is a view for explaining a size of a face, which is detected.
Figure 11:
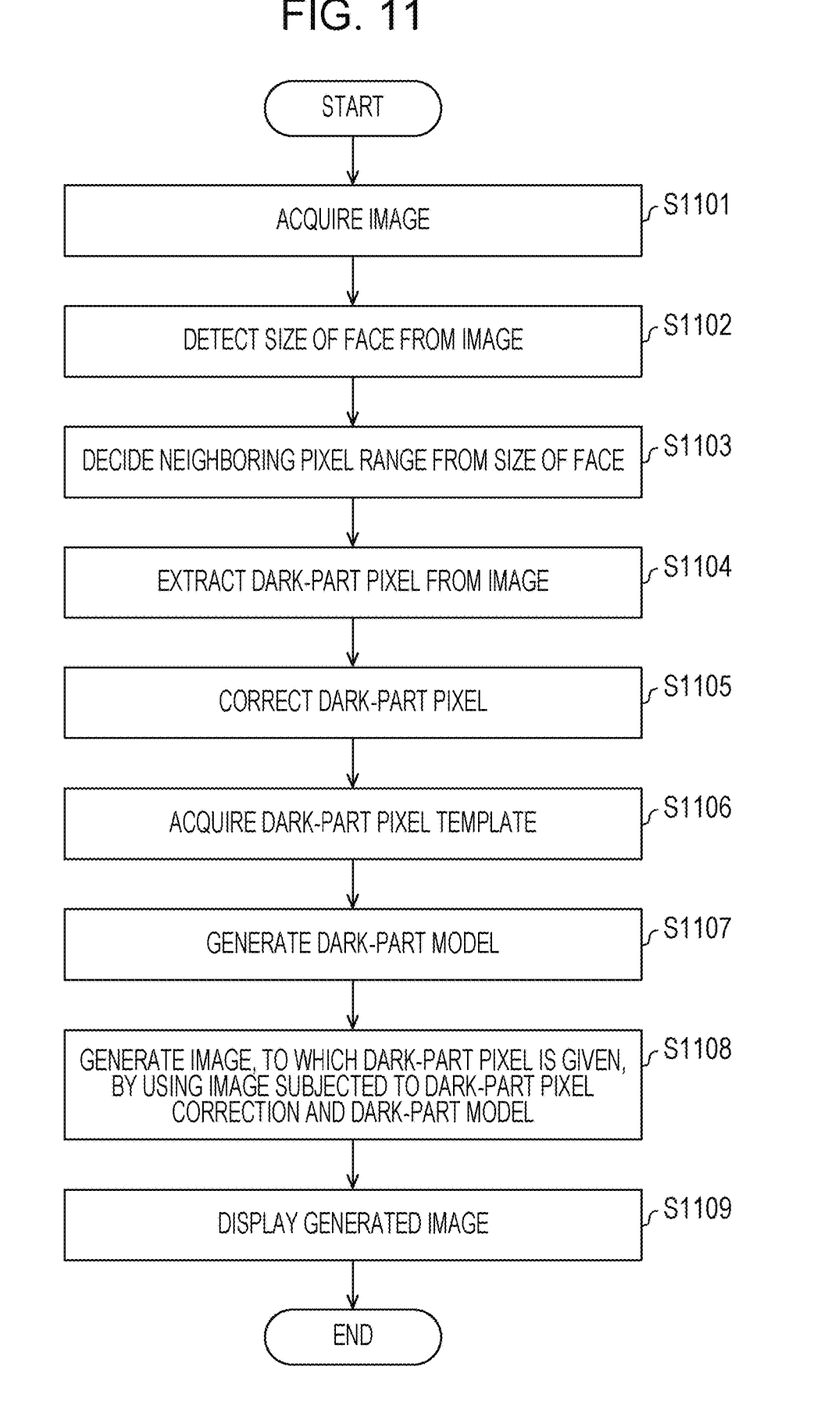
FIG. 11 is a flowchart illustrating a flow of the image processing in the second embodiment of the invention.

Next, an operation of the image display apparatus 902 in the second exemplary embodiment will be described in detail by using FIG. 10 and FIG. 11. First, an operation of the face detection unit 903 will be described in detail by using FIG. 10. FIG. 10 is a view for explaining a size of a face, which is detected.

<Face Detection Processing>

The face detection unit 903 detects a size of a face of a subject from an image. A size of a face here means the number of pixels in a width direction W1001 and the number of pixels in a height direction H1002 in a detected face region. As methods of detecting a size of a face from an image, a method of specifying a face region by detecting a skin color and a method of detecting positional information of a face and information of a size of the face by statistically obtaining an identification function from learning samples of a large number of images each of which includes a face and images each of which does not include a face (non-face) (P. Viola and M. Jones, "Rapid object detection using a boosting cascade of simple features", Proc. IEEE Conf. CVPR, pp. 511-518, 2001) have been known, and the detection is able to be realized by using any of the above-described methods. As above, the detection of a size of a face is performed.

<Neighboring Pixel Range Decision Processing>

Next, an operation of the neighboring pixel range decision unit 904 will be described in detail. Here, a size of a neighboring pixel to be used for dark-part pixel extraction is decided. Since a shadow to be generated becomes larger as a size of a face of a subject becomes larger, the neighboring pixel range decision unit 904 sets a neighboring pixel range to be larger. Since a shadow to be generated becomes smaller as a size of a face of a subject becomes smaller, the neighboring pixel range decision unit 904 sets the neighboring pixel range to be smaller. When the neighboring pixel range is N× M, setting the neighboring pixel range to be larger means enlarging the neighboring pixel range to kN× kM, and setting the neighboring pixel range to be smaller means reducing the neighboring pixel range to N/k× M/k (here, it is preferable that k>1 and, for example, a value of k=2, 3 or the like are satisfied). Thereby, it is possible to avoid failing to extract a dark-part pixel constituting a large shadow as a result of performing dark-part pixel extraction by using a small neighboring pixel range although a size of a face of a subject is large, and to avoid extracting, as a dark-part pixel, an eyebrow, a line round an eye, or minute shade which makes a good impression, such as shade in a vicinity of a contour as a result of performing dark-part pixel extraction by using a large neighboring pixel range although a size of a face of a subject is small. As above, with the aforementioned configuration, it is possible to correct only a dark-part pixel which is not necessary while remaining a preferable dark-part pixel.

Moreover, the neighboring pixel range decision unit 904 may change a shape of a neighboring pixel range in accordance with a size of a face of a subject. For example, when a longitudinal length and a lateral length of a size of a face of a subject are almost the same, the neighboring pixel range decision unit 904 determines that the face of the subject is roundish, and sets a round-shaped neighboring pixel range. The shape of a neighboring pixel range may include not only a square, a rectangle, a round shape but also other combinations of pixels such as a cross formed by four neighboring pixels in an up-and-down direction and a right-and-left direction and a cross formed by four neighboring pixels only in oblique directions. Since, by changing the shape of a neighboring pixel range in accordance with a subject, image processing is performed in a neighboring range suitable for the subject, the image generation unit is able to improve quality of a generated image, so that it is suitable.

Hereinafter, a flow of the aforementioned operation will be described by using a flowchart illustrated in FIG. 11.

First, at step S1101, the image-processing device 901 takes in an image from the image capturing unit 103 or the storage unit 105. Next, at step S1102, the face detection unit 903 detects a size of a face from the image taken in at step 1101. This processing corresponds to the above-described face detection processing. Then, at step S1103, the neighboring pixel range decision unit 904 decides a neighboring pixel range from the size of the face detected at step S1102. This processing corresponds to the above-described neighboring pixel range decision processing. Thereafter, at step S1104, the dark-part pixel extraction unit 107 extracts a dark-part pixel from the image taken in at step S1101 and the neighboring pixel range decided at step S1103. Then, at step S1105, the dark-part pixel correction unit 108 corrects the dark-part pixel extracted at step S1104. Next, at step S1106, a dark-part pixel template is acquired from the storage unit 105. Thereafter, at step S1107, the dark-part model generation unit 109 generates a dark-part model by using the dark-part pixel template acquired at step S1106. Next, at step S1108, the image generation unit 110 gives the dark-part model to the image subjected to the dark-part pixel correction by using the dark-part model generated at step S1107 and generates an image like an image captured by changing a position of illumination. Then, at step S1109, the image generation unit 110 outputs the image generated at step S1108 to the display unit 104. The above is the flow of the operation of the image-processing device 901. The image display apparatus 902 in the second exemplary embodiment operates in the above-described manner.

With the image display apparatus 902 that includes the above-described image-processing device 901 according to the present invention, since a range of dark-part pixels to be extracted is controlled on the basis of a size of a subject, it is possible to give desired dark-part pixels to an image, in which unnecessary dark-part pixels have been corrected, while remaining preferable dark-part pixels, thus making it possible to display an image having a suitable stereoscopic effect.

Note that, the invention should not be restrictively interpreted on the basis of the above-described exemplary embodiments, and various modifications are possible within the scope of matters described in the scope of claims, and included in the technical scope of the invention.

A program that runs in the image-processing device according to the invention may be a program which controls a CPU or the like (program which causes a computer to function) so as to realize the functions of the aforementioned exemplary embodiments related to the invention. The pieces of information handled by these devices are temporarily accumulated in a RAM (Random Access Memory) during the processing thereof, and then stored in various ROMs (Read Only Memories) such as a ROM, and HDDs, and read, corrected, and written by the CPU as necessary.

Moreover, processing of each of the units may be performed by recording a program, by which the function of each configuration in FIG. 1 is realized, in a computer readable recording medium, and causing a computer system to read the program recorded in the recording medium to execute by the CPU or the like. Note that, the "computer system" here is set to include an OS (Operating System) and hardware such as peripheral equipment. Moreover, the "computer readable recording medium" refers to a portable medium such as a flexible disk, a magneto-optical disk, a ROM, or a CD-ROM, or a storage device embedded in a computer system, such as a hard disk or the like. Further, the "computer readable recording medium" includes one which dynamically holds a program for a short time, such as a communication line in a case where the program is transmitted through a network such as the Internet or a communication line such as a telephone line, and one which holds a program for a fixed time, such as a volatile memory inside a computer system serving as a server or a client in the above case.

Moreover, a part or all of the image-processing device in each of the above-described exemplary embodiments may be realized typically as an LSI which is an integrated circuit. Each functional block of the image-processing device may be individually formed into a chip, or a part or all thereof may be integrated and formed into a chip. A method for making into an integrated circuit is not limited to the LSI and a dedicated circuit or a versatile processor may be used for realization. Further, in a case where a technique for making into an integrated circuit in place of the LSI appears with advance of a semiconductor technique, an integrated circuit by the technique is also able to be used.

In addition, in the above-described exemplary embodiments, among control lines and information lines, ones that are considered to be necessary for description are illustrated, and all of the control lines and information lines indispensable for a product are not necessarily illustrated. All of the constituents may be connected to each other.

CONCLUSION

An image-processing device according to an aspect 1 of the invention includes: a dark-part pixel extraction unit 107 that extracts one or more dark-part pixels from a target image; a dark-part pixel correction unit 108 that generates a correction image by correcting the one or more dark-part pixels so as to suppress change in contrast of the target image; a dark-part model generation unit 109 that generates a dark-part model on the basis of the dark-part pixels; and an image generation unit 110 that gives dark-part pixels constituting the dark-part model to the correction image.

With the aforementioned configuration, since the dark-part pixel constituting the dark-part model is given to the correction image which is generated by correcting the one or more dark-part pixels so as to suppress change in contrast of the target image, it is possible to generate an image having a suitable stereoscopic effect. Moreover, the aforementioned configuration is easily applicable even in a case where a subject is moving.

In an image-processing device according to an aspect 2 of the invention, it is preferable that, in the aspect 1, in accordance with at least one of a color difference and a luminance difference between a target pixel in the target image and a neighboring pixel positioned in neighborhood of the target pixel, the dark-part pixel extraction unit 107 extracts the target pixel as a dark-part pixel.

With the aforementioned configuration, it is possible to suitably extract a dark-part pixel.

In an image-processing device according to an aspect 3 of the invention, it is preferable that, in the aspect 2, the dark-part pixel extraction unit 107 extracts the target pixel as the dark-part pixel, in a case where the color difference between the target pixel and the neighboring pixel is smaller than a threshold related to the color difference and a luminance difference obtained by subtracting luminance of the target pixel from luminance of the neighboring pixel is a positive value and smaller than a threshold related to the luminance difference.

With the aforementioned configuration, it is possible to more suitably extract a dark-part pixel.

In an image-processing device according to an aspect 4 of the invention, it is preferable that, in the aspects 1 to 3, the image generation unit 110 changes, in accordance with a sum of pixels in the correction image to which the dark-part model is applied, brightness of the dark-part model or brightness of the image to which the dark-part model has been applied.

With the aforementioned configuration, it is possible to give a natural dark-part model in which appearance of a color to a human is taken into consideration.

In an image-processing device according to an aspect 5 of the invention, it is preferable that, in the aspects 1 to 4, the image generation unit 110 changes, in accordance with the brightness of the dark-part model and a hue of a pixel in the correction image to which the dark-part model is given, a hue of the dark-part model or a hue of the image to which the dark-part model has been applied.

With the aforementioned configuration, it is possible to give a natural dark-part model in which appearance of a color to a human is taken into consideration.

It is preferable that, in the aspects 1 to 5, an image-processing device according to an aspect 6 of the invention further includes: a face detection unit 903 that detects information of a size of a face of a subject from an image; and a neighboring pixel range decision unit 904 that decides a possible range of a neighboring pixel, which is set by the dark-part pixel extraction unit 107, from the information of the size of the face, in which the dark-part pixel extraction unit 107 sets a pixel within the decided range as the neighboring pixel.

With the aforementioned configuration, a neighboring range suitable for a subject is set, so that it is possible to improve quality of a generated image.

An image-processing method according to an aspect 7 of the invention includes: a dark-part pixel extraction step of extracting one or more dark-part pixels from a target image; a dark-part pixel correction step of generating a correction image by correcting the one or more dark-part pixels so as to suppress change in contrast of the target image; a dark-part model generation step of generating a dark-part model on a basis of the dark-part pixels; and an image generation step of giving dark-part pixels constituting the dark-part model to the correction image.

With the aforementioned configuration, an effect similar to that of the aspect 1 is achieved.

REFERENCE SIGNS LIST

101 image-processing device
102 image display apparatus
103 image capturing unit
104 display unit
105 storage unit
106 input/output unit
107 dark-part pixel extraction unit
108 dark-part pixel correction unit
109 dark-part model generation unit
110 image generation unit
903 face detection unit
904 neighboring pixel range decision unit

The invention claimed is:

1. An image-processing device comprising:
a dark-part pixel extraction unit that extracts one or more dark-part pixels from a target image;
a dark-part pixel correction unit that corrects the one or more dark-part pixels so as to reduce a difference in pixel value between the one or more dark-part pixels and pixels other than the one or more dark-part pixels in the target image;
an image generation unit that gives dark-part pixels which are corrected on a basis of the one or more dark pixels of the target image to the target image in which the one or more dark-part pixels have been corrected by the dark-part pixel correction unit;
a face detection unit that detects information of a size of a face of a subject from an image; and
a neighboring pixel range decision unit that decides a possible range of a neighboring pixel, which is set by the dark-part pixel extraction unit, from the information of the size of the face, wherein
the dark-part pixel extraction unit sets a pixel within the decided range as the neighboring pixel.

2. An image-processing device comprising:
a dark-part pixel extraction unit that extracts one or more dark-part pixels from a target image;
a dark-part pixel correction unit that corrects the one or more dark-part pixels so as to reduce a difference in pixel value between the one or more dark-part pixels and pixels other than the one or more dark-part pixels in the target image;
an image generation unit that gives dark-part pixels which are corrected on a basis of the one or more dark part pixels of the target image to the target image in which the one or more dark-part pixels have been corrected by the dark-part pixel correction unit, wherein
in accordance with at least one of a color difference and a luminance difference between a target pixel in the target image and a neighboring pixel positioned in neighborhood of the target pixel, the dark-part pixel extraction unit extracts the target pixel as a dark-part pixel, and the dark-part pixel extraction unit extracts the target pixel as the dark-part pixel, in a case where the color difference between the target pixel and the neighboring pixel is smaller than a threshold related to the color difference and the luminance difference obtained by subtracting luminance of the target pixel from luminance of the neighboring pixel is a positive value and smaller than a threshold related to the luminance difference, the image-processing device further comprising:

a face detection unit that detects information of a size of a face of a subject from an image; and a neighboring pixel range decision unit that decides a possible range of a neighboring pixel, which is set by the dark-part pixel extraction unit, from the information of the size of the face, wherein the dark-part pixel extraction unit sets a pixel within the decided range as the neighboring pixel.

3. An image-processing device comprising:

a dark-part pixel extraction unit that extracts one or more dark-part pixels from a target image;

a dark-part pixel correction unit that corrects the one or more dark-part pixels so as to reduce a difference in pixel value between the one or more dark-part pixels and pixels other than the one or more dark-part pixels in the target image;

an image generation unit that gives dark-part pixels which are corrected on a basis of a present dark-part model to the target image in which the one or more dark-part pixels have been corrected by the dark-part pixel correction unit;

a face detection unit that detects information of a size of a face of a subject from an image; and a neighboring pixel range decision unit that decides a possible range of a neighboring pixel, which is set by the dark-part pixel extraction unit, from the information of the size of the face, wherein the dark-part pixel extraction unit sets a pixel within the decided range as the neighboring pixel.

4. An image-processing device comprising:

a dark-part pixel extraction unit that extracts one or more dark-part pixels from a target image;

a dark-part pixel correction unit that corrects the one or more dark-part pixels so as to reduce a difference in pixel value between the one or more dark-part pixels and pixels other than the one or more dark-part pixels in the target image;

an image generation unit that gives dark-part pixels which are corrected on a basis of a preset dark-part model to the target image in which the one or more dark-part pixels have been corrected by the dark-part pixel correction unit, wherein in accordance with at least one of a color difference and a luminance difference between a target pixel in the target image and a neighboring pixel positioned in neighborhood of the target pixel, the dark-part pixel extraction unit extracts the target pixel as a dark-part pixel, and the dark-part pixel extraction unit extracts the target pixel as the dark-part pixel, in a case where the color difference between the target pixel and the neighboring pixel is smaller than a threshold related to the color difference and the luminance difference obtained by subtracting luminance of the target pixel from luminance of the neighboring pixel is a positive value and smaller than a threshold related to the luminance difference, the image-processing device further comprising:

a face detection unit that detects information of a size of a face of a subject from an image; and a neighboring pixel range decision unit that decides a possible range of a neighboring pixel, which is set by the dark-part pixel extraction unit, from the information of the size of the face, wherein the dark-part pixel extraction unit sets a pixel within the decided range as the neighboring pixel.

* * * * *